Oct. 16, 1956     C. W. MILLER ET AL     2,767,347
AUTOMATIC HEADLIGHT DIMMER SYSTEM
Filed Sept. 27, 1951     3 Sheets-Sheet 1
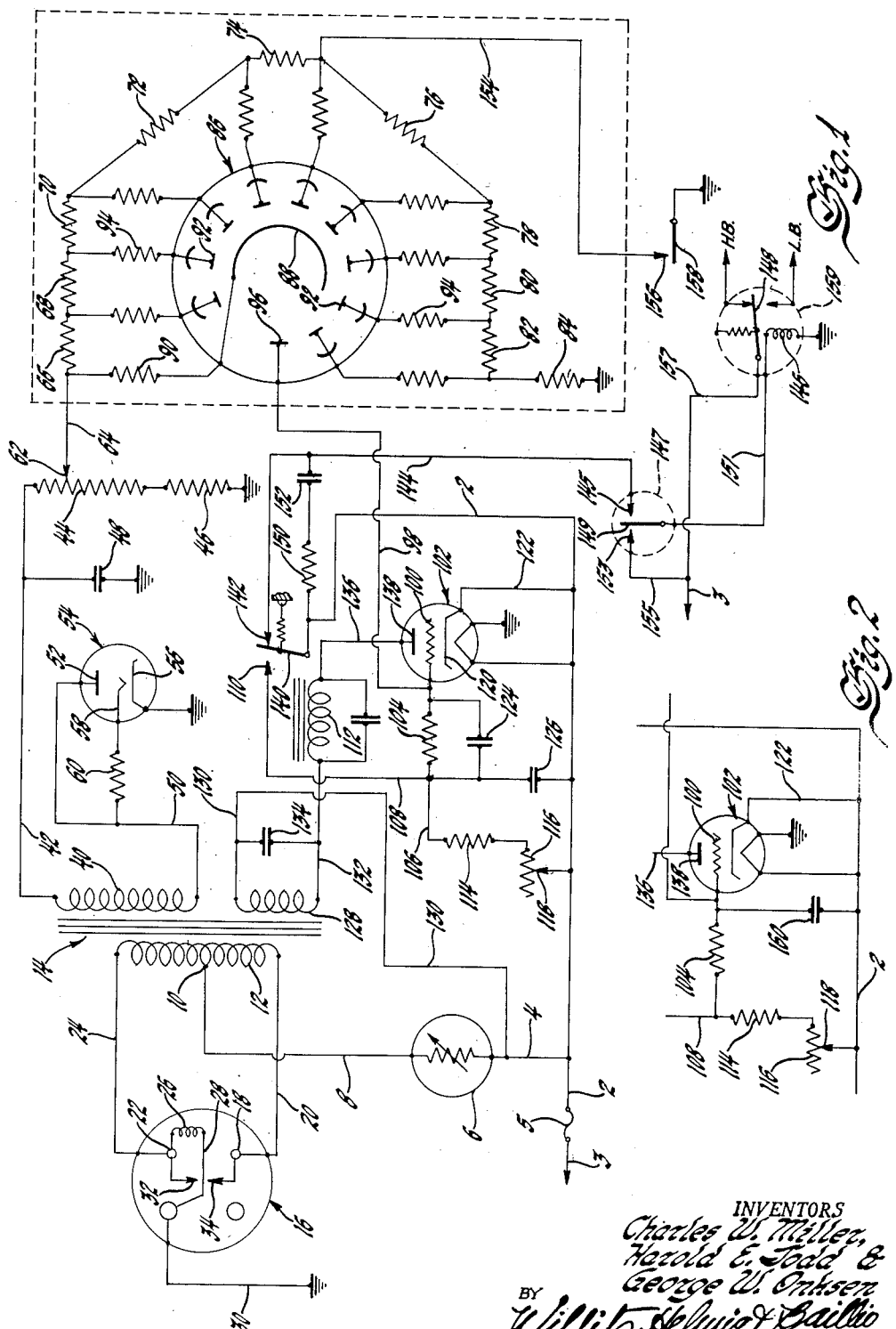
INVENTORS
Charles W. Miller,
Harold E. Todd &
George W. Onksen
BY Willits, Helwig & Baillio
ATTORNEYS Oct. 16, 1956  C. W. MILLER ET AL  2,767,347
AUTOMATIC HEADLIGHT DIMMER SYSTEM
Filed Sept. 27, 1951  3 Sheets-Sheet 2

INVENTORS
Charles W. Miller,
Harold E. Todd &
George W. Onksen
BY Willits, Helwig & Baillio
ATTORNEYS Oct. 16, 1956  C. W. MILLER ET AL  2,767,347
AUTOMATIC HEADLIGHT DIMMER SYSTEM
Filed Sept. 27, 1951  3 Sheets-Sheet 3

INVENTORS
Charles W. Miller,
Harold E. Todd &
George W. Onksen
BY Willits, Helwig & Baillio
ATTORNEYS

United States Patent Office 2,767,347
Patented Oct. 16, 1956

2,767,347

AUTOMATIC HEADLIGHT DIMMER SYSTEM

Charles W. Miller, Harold E. Todd, and George W. Onksen, Anderson, Ind., assignors to General Motors Corporation, Detroit, Mich., a corporation of Delaware Application September 27, 1951, Serial No. 248,498

18 Claims. (Cl. 315—83)

This invention relates to light sensitive control systems and more particularly to light sensitive control systems for automatically switching automobile multi-beam headlamps between high and low filaments. Conventional automobile headlighting systems provide both what may be termed an upper and a lower beam, the first being used for high speed country night driving where it is necessary for the operator to see some distance ahead of the car. However, this amount of light and its direction are considerably annoying to an approaching driver and prevent him from adequately seeing his path ahead. In passing other vehicles it is customary to switch the headlights to low beam, which concentrates the lighting just ahead of the vehicle and prevents it from shining into the eyes of the oncoming driver. In the past this switching has been accomplished by depressing a foot dimmer switch located on the floor of the driver's compartment. Automatic systems have been designed to actuate means for changing from high to low beam controlled by the illumination of approaching headlights and such a system is disclosed in a co-pending United States application S. N. 165,392, filed June 1, 1950, in the names of George W. Onksen, Jr., and Charles W. Miller which issued July 10, 1956 as Patent 2,754,452.

The present invention relates to an improvement over that in the above identified application.

It is an object of our invention to provide a simplified light sensitive system for automatically controlling the switching means for dimming automotive headlights.

It is a further object of our invention to provide a simple and rugged headlight dimming system for automatically switching from high to low beam filaments upon the approach of illuminated sources on another vehicle, which includes the provision of means for energizing and deenergizing the switching means at different illumination levels.

It is a still further object of our invention to provide in a multifilament headlamp control system optional means for either completely automatic or completely manual control of headlamp beams.

It is a still further object of our invention to provide means for obtaining a non-automatic lower beam if desired.

It is a still further object of our invention to provide means for manually switching to vary the sensitivity ratio of the system between high and low beam position to obtain more satisfactory operation in the twilight period of the day.

It is a still further object of our invention to provide simplified means for overriding the automatic means to return the lights to high beam if so desired.

With these and other objects in view which will become apparent as the specification proceeds, our invention will be best understood by reference to the following specification and claims and the illustrations in the accompanying drawings, in which:

Figure 1 is a schematic wiring diagram of a control system embodying our invention.

Figure 2 is a partial schematic diagram showing a modified form of biasing system for the amplifier control tube of the system.

Figure 3:
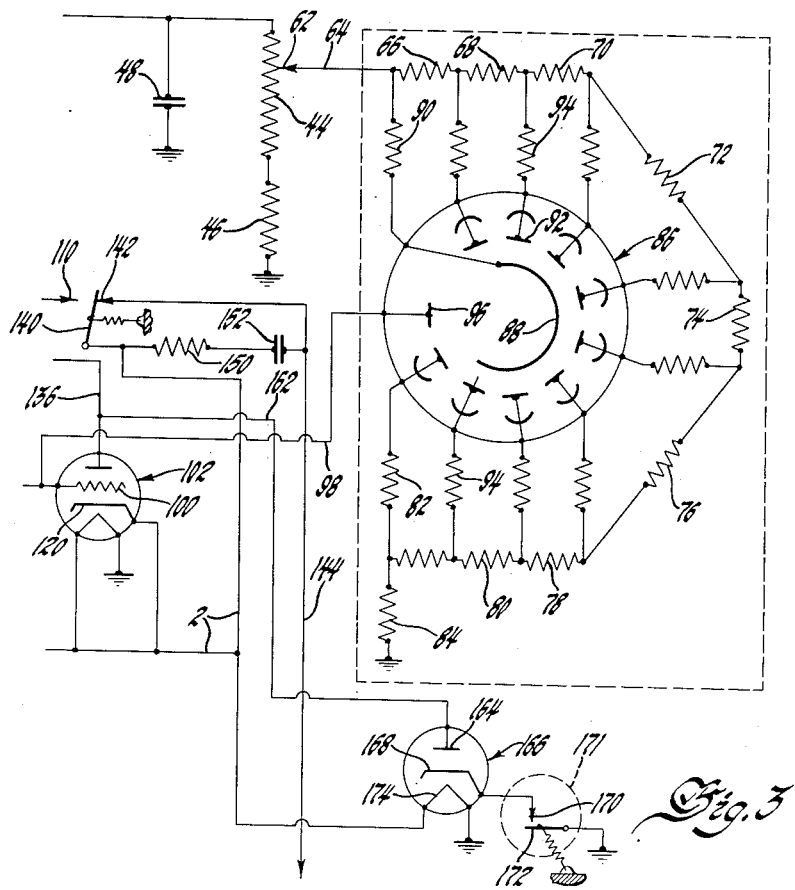
Figure 3 is a partial schematic diagram showing a modification for the location of the overriding foot switch.

Referring more particularly to the system shown in Figure 1, this system consists in the main of a power supply unit, a photosensitive unit, amplifying means therefor and relay operated switching means for switching the headlamp filaments between high and low beam. The source of power is, of course, the conventional automobile battery (not shown) and connected through battery cable 3 and protective fuse 5 is a supply line 2. A tie line 4 is connected between line 2 and a current regulating tube 6, the opposite terminal of said tube being connected through line 8 to a center tap 10 on the primary 12 of a power transformer 14. A mechanical vibrator unit 16 has one terminal 18 connected through line 20 to one end of the primary 12 and a second terminal 22 connected through line 24 with the opposite end of the primary winding. The operating coil 26 of the vibrator is connected between terminal 22 and the vibrating reed 28, the latter being connected to ground through line 30. One of the stationary contacts 32 of the vibrator is connected to terminal 22 and the other stationary contact 34 is connected to terminal 18. Thus, as the vibrator is moved back and forth by alternate energizations of the operating coil 26, it contacts first contact 32 and then contact 34 to alternately energize the halves of the primary 12 of the transformer 14, the current thereto being regulated by the current regulator tube 6.

Transformer 14 is provided with two secondary windings. The first, winding 40, has one terminal connected through line 42 with one end of a potentiometer 44, the opposite end of the latter being connected in series with a second resistor 46 and thence to ground. The line 42 is connected through smoothing condenser 48 to ground. The opposite end of the secondary winding 40 is connected through line 50 to the anode 52 of a half wave rectifier tube 54, the cathode 56 of which is grounded. The igniter or starting electrode 58 of this tube is connected through resistor 60 with line 50. This secondary winding 40 is of a relatively large number of turns and produces a relatively high voltage for the photomultiplier tube. The voltage supplied is rectified by the tube 54 to produce a negative voltage at line 42.

The variable tap 62 on the potentiometer 44 is the high voltage take-off and this is connected through line 64 with a plurality of dropping resistors 66, 68, 70, 72, 74, 76, 78, 80, 82 and 84 to ground to provide the necessary voltages per stage of the photomultiplier tube 86. The main cathode 88 of the photomultiplier tube 86 is connected to line 64 through protective resistor 90 and the dynodes 92 are connected at tapped intervals between the series resistors through protective resistors 94 to provide the necessary voltage for each. The anode 96 of the photomultiplier tube is connected through line 98 with control grid 100 of the main amplifier tube 102. This grid is connected directly also to a biasing resistor 104 whose opposite terminal is connected to line 106. A tie line 108 connects line 106 to a stationary contact 110 of the operating relay 112. Line 106 is also connected to one terminal of a resistor 114 which is connected in series with a variable potentiometer 116, the adjustable tap 118 of which is connected directly to supply line 2. The cathode 120 of the tube 102 is also connected directly to line 2 through line 122. A condenser 124 is connected across the biasing resistor 104 and a condenser 126 is connected between line 108 and supply line 2. These condensers are provided to reduce any ripple in the output of the photomultiplier tube due to ripple in line 64 caused by half wave rectification of secondary 40.

A second secondary winding 128 of the transformer 14 has one terminal connected through line 130 to tie line 4. An opposite terminal is connected through line 132 to one side of the relay operating coil 112 and a condenser 134 is connected across lines 130 and 132. The opposite terminal of the relay actuating coil 112 is connected through line 136 to the anode 138 of the tube 102. The movable armature 140 of the relay 112 oscillates between stationary contact 110 and stationary contact 142 and is connected directly to supply line 2. Armature 140 is spring biased toward contact 142. Stationary contact 142 on the other hand is connected through line 144 to stationary contact 145 of a standard foot dimmer switch 147. The other stationary contact 153 of dimmer switch 147 is connected through line 155 to cable 3. Cable 3 is also connected through line 157 to movable armature 148 of power relay 159. The movable contact 149 of switch 147 is connected through line 151 to power relay coil 146 which operates its armature 148 between two stationary contacts to switch from the high beam line HB to the low beam line LB when energized. The other terminal of coil 146 is connected to ground. A resistance 150 and a condenser 152 are connected in series across lines 2 and 144. A conductive line 154 is connected to the junction between resistors 74 and 76 and extends to a stationary contact 156 which cooperates with a movable manual switch arm 158 which is directly connected to ground.

The vibrator power supply unit provides high voltage for the photo multiplier tube 86 which is adjustable through movement of the tap 62 over the resistor 44. This power which is provided by the secondary 40 is rectified by rectifying tube 54 and smoothed by condenser 48. This applies the proper potentials to each of the dynodes 92 of the photomultiplier tubes 86. These dynodes are protected from damage by series resistors 94. The only regulation applied to this system is that provided by current regulator tube 6 in the primary circuit. The power for the switching relay 112 is provided by secondary 128 and is rectified by the normal operation of the tube 102.

In the operation the line 3 is connected to the source of power. With no light falling on the photomultiplier 86, amplifier tube 102 is so biased through resistor 104 as to be conductive. It should be noted that the additional biasing resistors 116 and 114 are at this instant shorted since movable armature 140 contacts stationary contact 110, this switch being in the left-hand position at this time, since relay coil 112 is energized by the flow of current through the tube. Line 144 is open and condenser 152 blocks the passage of direct current thereto. With movable contact 149 engaging stationary contact 145, armature 148 is held to the HB position by spring biasing means, energizing the high beam from the cable 3 through line 157. If light falls on the photomultiplier tube, the anode 96 passes current through line 98, resistor 104, line 108, contact 110, and armature 140 to line 2 causing the grid 100 of the amplifier tube 102 to become negative with respect to its cathode 120. As control grid 100 becomes negative, the flow of current through tube 102 decreases. If sufficient light falls on the photomultiplier tube, the current through tube 102 is reduced to a point where relay coil 112 will be deenergized enough to drop its armature 140, allowing the spring bias to pull the same to the right against contact 142. This completes a power circuit to relay coil 146 which is energized, attracting its armature 148 and switching from high to low beam. When the intensity of the light which falls on the photomultiplier 86 decreases, the negative bias will be removed from the grid 100, permitting the tube to again conduct, energizing relay 112 and returning armature 140 to energized position at the left, deenergizing power relay coil 146 and again switching back to high beam.

It has been found necessary, however, to provide some means for changing the sensitivity of the amplifier between high beam and low beam positions. When a vehicle approaches a car equipped with an automatic headlight dimming system and the approaching vehicle usually has its lights switched on high beam, high intensity illumination is cast upon the photosensitive device which operates the same to dim the headlights. However, as soon as the headlights on the car equipped with the automatic system are switched to the low beam position, the approaching car usually, in courtesy, dims its lights. This at once reduces materially the amount of light falling on the control photocell and if the approaching vehicle is at some distance when dimming, the photocell will receive considerably less light than was originally required to switch to low beam position. It is therefore necessary to alter the sensitivity so that once the headlight system has automatically switched to the lower beam, it will remain there with considerably less light on the control cell than was necessary to initially operate it.

In this instance this change in sensitivity is provided by varying the bias on the grid through switching into and shorting out of the grid circuit resistors 114 and 116. As previously mentioned, in the high beam position these two resistances are shorted by line 2, armature 140, contact 110 and line 108; but are placed in the grid circuit when armature 140 moves away from contact 110 to obtain lower beam energization. The amplifier is much more sensitive in its lower beam position and does not require as much light on the photocell to hold it there. Switch 147 is the conventional ratchet type foot switch. As previously explained, the headlights are operated automatically by the illumination from approaching vehicles when the movable contact 149 is in engagement with contact 145. However, when contact 149 is manually moved to engage contact 153, current is supplied from the cable 3 through line 155, contacts 153 and 149, line 151 to relay coil 146, switching the headlights to a non-automatic lower beam.

There may be instances in which it is desired to return the system to high beam while the photocell control is sufficiently energized to maintain low beam; for example, in such instances where the oncoming vehicle has automatically caused the headlamps to be switched to low beam but the driver of the same oncoming vehicle has not depressed his own beams. This can be done by manually closing the overriding switch 158—156 which grounds the fifth stage of the photomultiplier tube and causes the current through line 98 to be greatly reduced. This substantially removes the bias on the amplifier which permits the same to return to conductive position and energizes the relay 112, deenergizing the power relay coil 146 and the lights go back to high beam. When the operator releases the switch 158, the photomultiplier tube system again takes over to switch back to low beam. This is merely an overriding feature.

A modified form of biasing circuit for the control grid 100 of the amplifier tube 102 is shown in Figure 2 and in that instance the variable potentiometer 116 and resistor 114 are again connected in series between lines 108 and 2. Resistance 104 is connected between line 108 and the grid 100 but condensers 124 and 126 have been eliminated and a single condenser 160 is connected directly from the control grid 100 to the power line 2. In order to further simplify the system for cost purposes, the rectifier 54 and the smoothing condenser 48 may be omitted. If this is done and line 50 is connected directly to ground, then alternating current voltage is applied to line 42 to supply the photomultiplier tube 86. Pulsating direct current signals will then be applied to the line 98 and a larger condenser such as 160 is necessary to smooth out the fluctuations to the control grid 100. While this condenser must be of higher value than condensers 24 and 26 in Figure 1, in order to provide greater smoothing action, its value is limited by the fact that any additional capacity at this point increases the time delay in returning to high beam energization. Therefore, its value is a compromise between obtaining a desired smoothing action without the introduction of too long a time delay. This provides approximately the same change in sensitivity between the low and high beam positions and provides for the use of a single condenser to reduce the ripple, somewhat simplifying the circuit.

Figure 5:
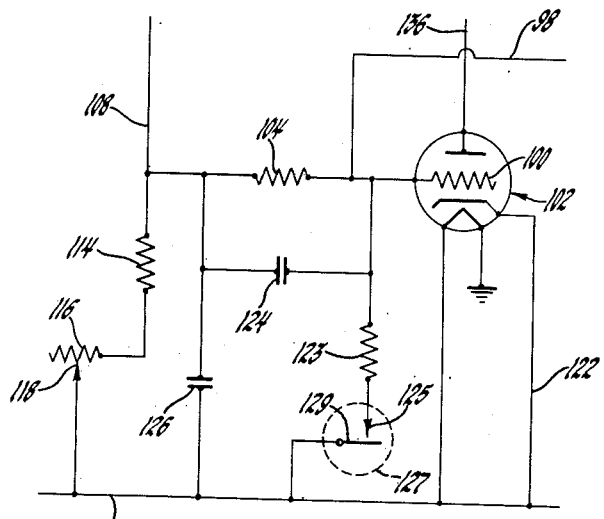
Figure 5 is a further partial schematic wiring diagram showing a modified circuit for the amplifying tube control.

In the operation of the headlamp dimmer system as shown in Figure 1 light falling on the pick-up unit causes the low beam filaments to be energized. In operating this system during the twilight hours when the sky may still retain a relatively large amount of light but the driver would like to have high beam illumination, the reflected light from the sky may be sufficient to hold the system on low beam. In order to overcome this situation during this period the control system may be modified as shown in Figure 5.

The amplifier tube 102 is connected as previously in the circuit with resistor 104 connected directly to grid 100 as well as line 98 from the photomultiplier tube 86. Line 108 is directly connected to resistor 114 and to the opposite terminal of resistor 104. Potentiometer 116—118 is connected between resistance 114 and line 2. Condenser 126 is connected between lines 108 and 2 and condenser 124 is directly connected across the resistor 104. In this case an additional resistor 123 has one terminal connected to the grid 100 and the opposite terminal connected to a stationary contact 125 of a manual switch 127, the movable switch arm 129 of which is directly connected to line 2. As exemplary of values which might be used for these resistances to obtain the desired operation are the following:

|     | Megohms |
| --- | --- |
| 114 | 10 |
| 116 | 0–10 |
| 104 | 1.5 |
| 123 | 10 |

It has been found that satisfactory night operation is obtained when the amplifier is ten times as sensitive at low beam as it is on high beam. If resistance 104 is 1.5 megohms, then resistance 116 is adjusted so that the total of the resistances 104, 114 and part of 116 will be 15 megohms to provide this 10:1 ratio. This relatively high sensitivity will prevent the system switching to high beam if there is an appreciable amount of illumination in the sky such as occurs at twilight and in order to switch to high beam and still retain automatic operation we have provided means to reduce the sensitivity of the amplifier. When switch 127 is closed, resistance 123 is connected in parallel with either resistance 104 or resistances 104, 114 and part of 116 in series. At the values selected which are only exemplary, the switching in of resistor 123 will reduce the sensitivity when on high beam only relatively slightly, but when on low beam to a considerable amount. Where the sensitivity ratio with switch 127 open was approximately 10:1, with the switch closed this ratio becomes approximately 5:1. This prevents reflected sky light from holding the system on low beam once an approaching vehicle has passed. After darkness has fallen, the switch 127 may be opened to return full sensitivity to the amplifier.

Figure 3 shows a slightly modified form in which the overriding foot switch is connected to a different part of the system. The photomultiplier tube 86 is shown connected to the potentiometer 44 through the variable tap 62 and the anode 96 of the photomultiplier again controls the grid 100 of the amplifying tube 102. The anode circuit 136 of the amplifier tube 102 has connected thereto a tie line 162 which extends to the anode 164 of a rectifier tube 166, the cathode 168 being connected to a stationary contact 170 of the overriding switch 171. The movable contact 172 of this switch is grounded. The filament 174 of the rectifier tube or diode is connected between power line 2 and ground. This overriding switch 171 is spring biased to open position. When it is desired to reenergize the control relay 112 to switch back to high beam, while the phototube is still applying a cut-off bias to the amplifier, this can be accomplished by closing the switch 172—170 and grounding the cathode 168 so that the rectifier will conduct and current be directly applied to the control relay coil 112 to switch to high beam. The rectifier tube is used to prevent chatter of the relay on alternating current operation.

Figure 4:
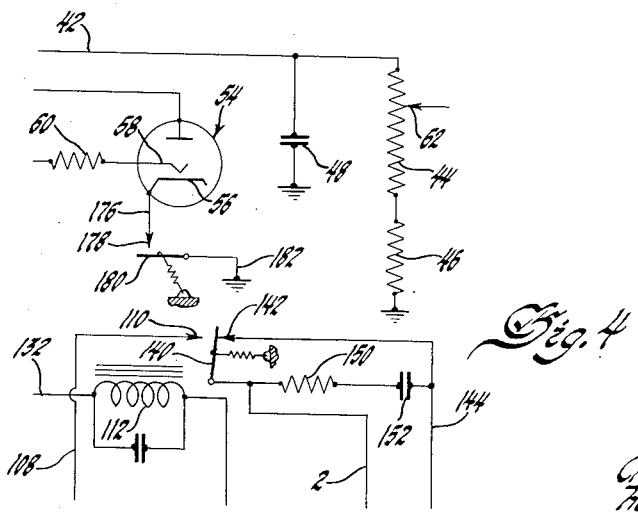
Figure 4 is a further partial schematic wiring diagram showing a still further location for the connection of the overriding foot switch.

Figure 4 shows a still further location for the overriding switch and in this case it is incorporated in the cathode circuit of the rectifier tube 54. This circuit has inserted therein a line 176 connecting the cathode 56 to a stationary contact 178 which cooperates with the movable arm 180 of the overriding switch which is grounded through line 182. Here the switch 178—180 is normally closed to complete the circuit for the rectifier 54 which then operates in its usual manner as described with reference to Figure 1, but when the operator desires to override the photocell control, he may do so by opening switch 178—180 which thus deenergizes the complete secondary circuit and removes power from the photomultiplier tube.

Figure 6:
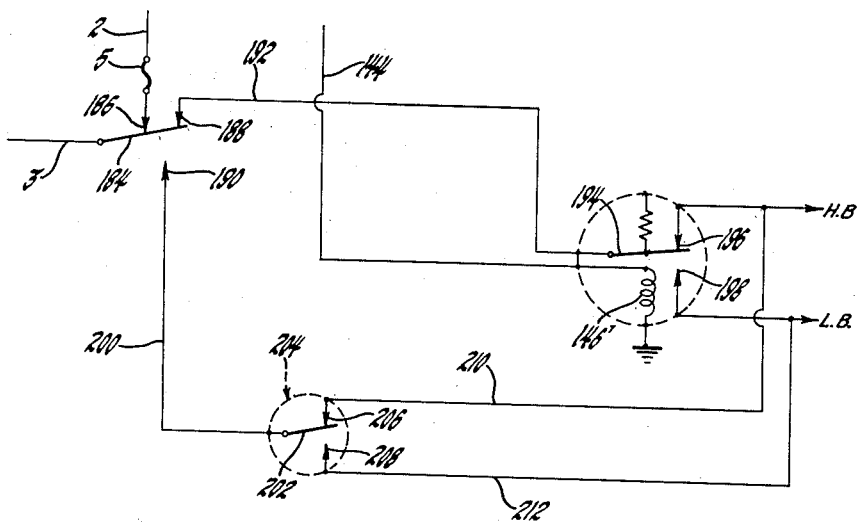
Figure 6 is a partial schematic wiring diagram of a modified form of automobile headlighting circuit adapted to our automatic control system.

It may be desirable to provide a system in which the conventional foot switch is completely inoperative when the automatic system is acting so that the driver is not confused. Such a system is disclosed in Figure 6. In that figure, cable 3 is connected directly to the movable arm 184 of a manual double throw switch. In one position arm 184 engages stationary contacts 186 and 188 and in the opposite position it engages stationary contact 190. Contact 186 is connected to supply line 2 for the automatic system. Contact 188 is connected through line 192 to movable armature 194 of the power relay which is actuated by relay coil 146', the latter being connected directly to line 144 of the automatic control. Armature 194 is spring biased toward stationary contact 196 which is connected to the high beam filaments HB. It engages contact 198, which is connected to the low beam filaments LB, when moved by the coil 146'. Stationary contact 190 is connected through line 200 with movable switch arm 202 of the conventional foot dimmer switch 204. This arm 202 oscillates between two stationary contacts 206 and 208, engaging one or the other. Contact 206 is connected through line 210 to the high beam filaments HB and contact 208 through line 212 to the low beam filament line LB.

When the manually operable switch 184, which may be mounted on the instrument panel, is moved to the upper position as shown, the automatic system is energized through line 2 as previously and a supply circuit is completed to armature 194, which will energize either the high or low beam, dependent upon the energization of the relay coil 146' by the automatic system. At this time the foot dimmer switch 204 is entirely electrically inoperative. This provides a completely automatic system.

If the operator desires to utilize the manual foot dimmer control, the switch 184 is moved to the lower position, opening the supply to the automatic system at 186. The completion of the circuit at 190 places the foot switch 204 in an obvious circuit and it may then conventionally control high or low beam energization as desired.

It is thus obvious that we have provided automatic control systems whereby when a predetermined amount of illumination falls on a photosensitive element, a switching means is energized to switch from high beam to low beam filaments and return to high beam filaments when such source of illumination is removed; that a variable sensitivity is provided so that a smaller amount of illumination is required to hold the device in low beam position after it has been moved to that point; that means for changing the sensitivity ratio between low and high beam for more satisfactory twilight operation is provided; that means for either complete automatic or complete manual operation of the switching means is provided; that a means for obtaining a non-automatic lower beam is provided; and that overriding dimming means have been provided to perimt the operator to return to high beam at any time, even though the automatic device demands low beam position.

We claim:

1. A light controlled system comprising multiple filament lamps, a source of electrical power, alternate switching means connected to the source of power and to the filaments energizing different filaments of the lamps, light sensitive means connected to the source of power, electronic amplifying means having a control electrode, the latter being connected to the light sensitive means, relay means connected in circuit with the electronic amplifying means for controlling the switching means, biasing means connected to the control element of the electronic amplifying means, a shunt circuit around a portion of the biasing means and a switch in the shunt circuit coupled to and to be actuated by the relay means to vary the bias on the control element with relay operation.

2. A light controlled system comprising multiple filament lamps, a source of electrical power, alternate switching means connected to the source of power and to the filaments energizing different filaments of the lamps, light sensitive means connected to the source of power, electronic amplifying means having a control electrode, the latter being connected to the light sensitive means, relay means connected in circuit with the electronic amplifying means for controlling the switching means, biasing resistor means connected to the control element, a shunt circuit around a portion of the resistor means, and switching means in the shunt circuit coupled to and to be actuated by the relay means to shunt out a portion of the resistor means to change the bias on the control element of the electronic amplifying means with relay operation.

3. A system for automatically dimming multiple filament headlamps comprising switching means connected to the filaments for switching from one filament to another, a source of power connected thereto, light sensitive means connected to said source of power, amplifying means connected to the light sensitive means and including a cathode, grid and anode, relay means in the anode circuit of the amplifying means actuating the switching means, biasing means connected between the source of power and grid including resistance means, shunting circuit means for a part of the resistance means, and switching means to be actuated by the relay means in the shunt circuit to control the same.

4. A system for automatically dimming multiple filament headlamps comprising switching means connected to the filaments for switching from one filament to another, a source of power connected to the switching means, light sensitive means connected to said source of power, amplifying means connected to the light sensitive means and including a cathode, grid and anode, relay means in the anode circuit of the amplifying means for actuating the switching means, biasing means connected between the source of power and grid including resistance means, capacitance means connected in shunt to the resistance means to reduce ripple currents on the amplifying means, a shunt circuit connected across a portion of the resistance means, and switching means in the shunt circuit to be actuated by the relay means to change the bias on the amplifier.

5. A system for automatically dimming multiple filament headlamps comprising a source of direct current power, a transformer having a center-tapped primary and a plurality of secondary coils, current regulating means connected between the source of power and the center tap of the primary coil, current interrupting means connected across the primary coil, light sensitive means connected to one of the secondary coils, amplifier means connected to the light sensitive means, relay means in series with the amplifier and connected to a second secondary coil, switching means connected to the source of power and to the filaments to be actuated by the relay means to alternately energize the different filaments, a grounding line connected to the light sensitive means, and manually operable switching means in the grounding line to apply a ground at will to override the automatic operation.

6. A system for automatically dimming multiple filament head lamps comprising a source of electrical power, switching means connected to the source of power and to the filaments for alternately energizing the same, a light sensitive photomultiplier tube connected to the source of power, amplifier means connected to the photomultiplier tube, relay means connected in the amplifier output to control the switching means, and a grounding circuit connected to the photomultiplier tube including a manual switch to ground the tube and prevent control of the amplifier by the photomuliplier tube.

7. A system for automatically dimming multifilament headlamps comprising a source of direct current power, switching means connected to the source of power and other filaments for alternately energizing the same, means for converting said power to alternating current of higher potential connected to the source of power, a photomultiplier tube connected to the higher potential supply, a relay coil also connected to the higher potential supply for actuating the switching means, amplifying means connected to the relay to control energization of the same and to the photomultiplier tube output and controlled thereby, rectifying means connected to the relay means and to ground, and manual switching means in the rectifier circuit to complete the same to override the automatic operation of the relay under photomultiplier tube control and energize the desired filaments.

8. A system for automatically dimming multi-filament headlamps comprising, a source of direct current power, means connected to the source of power for converting said power into high potential alternating current, photosensitive means connected to the high potential power, amplifying means including a control grid connected to the photosensitive means, means for reducing voltage fluctuations connected to the grid, biasing means connected to the grid, shunting means connected across a portion of the biasing means and fluctuation reducing means, switching means in circuit with the shunting means to complete the circuit, alternate switching means connected between the various filaments and the power source, and relay means in the output circuit of the amplifier to control both the switching means for the filament circuits and the shunting means.

9. A system for automatically dimming multi-filament headlamps comprising, a source of direct current power, means connected to the source of power for converting said power into high potential alternating current power, photosensitive means connected to the high potential power, amplifying means including a control grid connected to the photosensitive means, biasing and fluctuation reducing means connected to the grid, relay switching means connected in the output circuit of the amplifying means and to the filament circuits and being controlled by the amplifier to switch between filaments, a grounding circuit connected to the high potential circuit, and manual switching means in said grounding circuit to deenergize the photosensitive control portion but permit the amplifying means to conduct and maintain the control relay energized.

10. A system for automatically dimming multiple filament headlamps comprising, a source of direct current power, means connected to the source of power for converting said direct current power into high potential alternating current power, photosensitive means connected to the high potential alternating current power, amplifying means including a cathode and control grid connected to the photosensitive means, a plurality of parallel circuits including resistance interconnecting the grid and cathode of the amplifying means to provide sensitivity control for the same and switching means in one of the parallel circuits to open the same.

11. A system for automatically dimming multiple filament headlamps comprising, a source of direct current power, means connected to the source of power for converting said direct current power into high potential alternating current power, photosensitive means connected to the high potential alternating current power, amplifying means including a cathode and control grid connected to the photosensitive means, a first resistance means connected between the grid and cathode of the amplifier, shunting means connected around a portion of the first resistance means including a switch, a second resistance means connected between the grid and cathode in parallel with the first, a manual switch in series with the second resistance means and relay operating means connected in the output circuit of the amplifier means for controlling the switching means in the shunt circuit to vary the sensitivity of the amplifier between conducting and non-conducting periods which may be additionally varied by the inclusion of the second resistance to further vary the sensitivity during both periods.

12. A control system for multi-filament headlamps comprising, a source of power, a first switching means connected to the source of power, a second overcenter switching means connected to the first and to the filaments to alternately energize the same upon actuation through the first switching means and light sensitive switching means also connected to the first switching means and to the filaments to control the energization thereof through a parallel path independent of the second switching means in accordance with the amount of light falling on the light sensitive means.

13. A system for automatically dimming multiple filament headlamps comprising, switching means for switching from one filament to another, a source of power connected thereto, light sensitive means connected to said source of power, amplifying means connected to the light sensitive means and including a cathode, grid and anode, relay means in the anode circuit of the amplifying means for actuating the switching means, biasing means connected between the source of power and grid including resistance means, capacitance means connected in shunt to the resistance means to reduce ripple currents on the amplifying means, a shunt circuit connected across a portion of the resistance means, switch means in the shunt circuit to be actuated by the relay means to change the bias on the amplifier, a second switching means connected to the filaments to alternately energize the same and a double throw manual switching means whose movable member is connected to the second switching means, one of whose stationary contacts is connected to the relay actuated switching means and another to the source of power so that the second switching means may be connected to either the power source or the relay switching means as desired.

14. A system for automatically dimming multiple filament headlamps, switching means connected to said filaments for switching from one filament to another, a source of power connected to the switching means, light sensitive means connected to said source of power, amplifying means connected to the light sensitive means and including a cathode, grid and anode, relay means connected in the anode circuit of the amplifier means for actuating said switching means, biasing means connected to the grid and to the source of power, second switching means connected to the biasing means to vary the bias during different portions of the operating cycle, said second switching means also being actuated by said relay means, additional biasing means and switching means connected thereto and to the grid circuit to insert into the grid circuit the additional biasing means to alter the range of bias variation by the second switching means.

15. A system for automatically dimming multiple filament headlamps, switching means connected to said filaments for switching from one filament to another, a source of power connected to the switching means, light sensitive means connected to said source of power, amplifying means connected to the light sensitive means and including a cathode, grid and anode, relay means connected in the anode circuit of the amplifier means for actuating said switching means, biasing means connected to the grid, switching means connected to the biasing means to be actuated by the relay to vary the bias during different portions of the operating cycle, and range changing means connectable to the biasing means to determine the range of bias variation in the operation of the system.

16. A system for automatically dimming multiple filament headlamps, a source of power, switching means connected to the source of power and to the filaments for alternately energizing the same, light sensitive means connected to the source of power, amplifier means connected to the output of the light sensitive means, relay means connected in the amplifier output to control the switching means, and grounding means connected to the circuit in advance of the relay to render ineffective the operation of said light sensitive means and allow the relay to operate the switching means, irrespective of the quantity of light falling on the light sensitive cell.

17. A light sensitive control system comprising a source of electrical power, photosensitive means connected to the source of power, electronic amplifying means connected to the photosensitive means, a plurality of parallel biasing circuits connected to the electronic amplifying means to control the sensitivity of the amplifying means, and manual switching means connected to one of the parallel circuits to change the sensitivity of the amplifying means at will.

18. A system for automatically dimming multiple filament headlamps comprising, a source of electrical power, photosensitive means connected to said source of power, amplifying means connected to the photosensitive means, a plurality of biasing circuits connected to the amplifying means to control the sensitivity of said amplifying means, relay means connected to the amplifying means and controlled by the same, first switching means actuated by the relay means and connected to the filaments to control energization of the same, second switching means actuated by the relay means and connected to the biasing means to change the sensitivity of the amplifying means as the relay operates and manually operable switching means connected to a part of the biasing means to shunt the same to vary the sensitivity range of the amplifying means.

References Cited in the file of this patent
UNITED STATES PATENTS

| Number | Name | Date |
|---|---|---|
| 1,720,352 | Schmierer | July 9, 1929 |
| 1,994,310 | Holst | Mar. 12, 1935 |
| 2,431,394 | Friedman | Nov. 25, 1947 |
| 2,446,718 | Ray | Aug. 10, 1948 |
| 2,476,389 | Schmidt, Jr. | July 19, 1949 |
| 2,493,307 | Moore et al. | Jan. 3, 1950 |
| 2,558,969 | Le Croy | July 3, 1951 |
| 2,560,748 | Silva | July 17, 1951 |
| 2,598,420 | Onksen, Jr. | May 27, 1952 |